Figure 1:
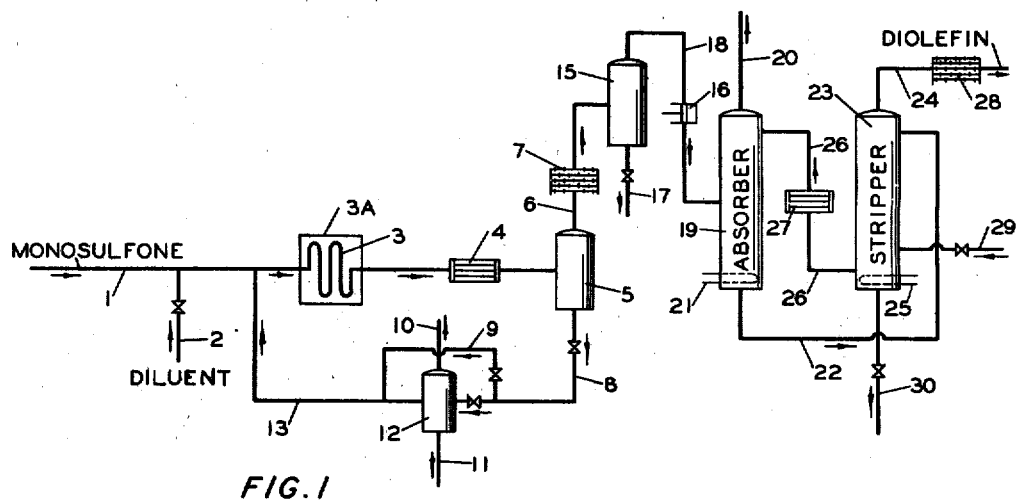

July 31, 1945.     F. E. FREY ET AL     2,380,832
PROCESS FOR THE DECOMPOSITION OF DIOLEFIN MONO-SULPHONES
Filed Dec. 16, 1941

INVENTOR
FREDERICK E. FREY
BY HAROLD J. HEPP
ATTORNEY

Patented July 31, 1945

2,380,832

UNITED STATES PATENT OFFICE 2,380,832

PROCESS FOR THE DECOMPOSITION OF DIOLEFIN MONOSULPHONES

Frederick E. Frey and Harold J. Hepp, Bartlesville, Okla., assignors to Phillips Petroleum Company, a corporation of Delaware Application December 16, 1941, Serial No. 423,236

12 Claims. (Cl. 260—681)

This invention relates to a process for decomposing aliphatic conjugated diolefin monosulphones for the recovery of the diolefin contained therein.

Aliphatic conjugated diolefins, such as butadiene, isoprene, piperylene, and the like, may be separated from mixture with other hydrocarbons by reacting with sulphur dioxide under conditions such as to prevent reaction of mono-olefins with sulphur dioxide and also to prevent formation of polymeric sulphones (polysulphones) of high molecular weight from the diolefins. Thus the reaction may be carried out at low temperatures in the presence of inhibitors such as hydroquinone, pyrogallol, phenyl-beta-naphthylamine and the like, or at relatively high temperatures, say 100° to 180° C. in the absence of catalysts or inhibitors. In either case the principal product formed is the aliphatic conjugated diolefin monosulphone with minor amounts of, or no, polymeric sulphones and hydrocarbon polymers. The diolefin monosulphone is characterized by its solubility in water and common organic solvents, and by the fact that upon heating it is decomposed into its components. The monosulphone may be recovered from other materials in the reaction mixture such as unreacted hydrocarbons and sulphur dioxide by any suitable means such as distillation, extraction, etc.

The recovered monosulphone may be decomposed by heating to temperatures above about 90° C., and preferably above about 110° C. However, if the decomposition is conducted in accordance with the prior practice, as by boiling the material in a pot to which is attached a spray trap, or fractionating column, there is a gradual accumulation of tarry material in the pot which makes stoppage and cleaning frequently necessary. In addition the loss of diolefin occasionally is excessive, due to various causes such as polymerization and/or polysulphone formation in the pot or column.

As an example of the amount of high-boiling, tarry products formed when the monosulphone decomposition is carried out batchwise in a pot or the like, 100 g. of monosulphone made by reacting piperylene with SO₂, and freed of polymeric products by precipitation from water solution (i. e. the mixture of monosulphone and a small amount of polysulphone was commingled with water to dissolve the monosulphone, the aqueous monosulphone solution separated from the undissolved polysulphone and then treated to separate the monosulphone from the water of solution) was placed in a distillation flask. Heat was applied to the bottom of the flask and the monosulphone decomposed over a period of about two hours at temperatures between 100 and 120° C. At the end of this time evolution of piperylene and sulphur dioxide stopped and the flask was allowed to cool. 2.9 g. of a black, tarry material remained in the flask. In a commercial installation such tarry products are distributed over the inner surfaces of the apparatus, steam or other heating coils, and require frequent cleaning which requires discontinuance of operation, involves excessive labor and other charges, and prevents operation in a continuous manner.

The principal object of the present invention is to provide an improved process for effecting decomposition of aliphatic conjugated diolefin monosulphones. Another object to devise a process in which better control of temperature is readily obtained.

A further object is to provide a process for decomposing such monosulphones wherein the deposition of tarry or other insoluble material in the decomposition zone is substantially or entirely avoided.

Another object is to minimize the loss of diolefin by polymerization and/or polysulphone formation during the decomposition step.

Another object is to provide a process more adapted to continuous operation.

Numerous other objects will hereinafter appear.

Figure 2:
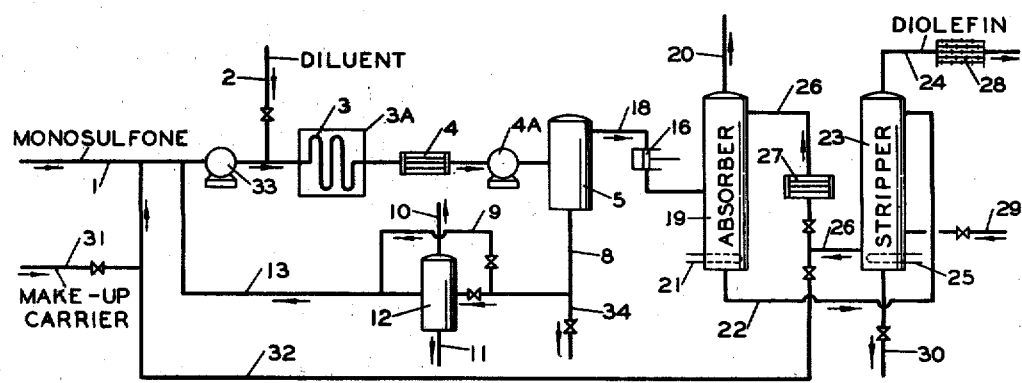
Figure 3:
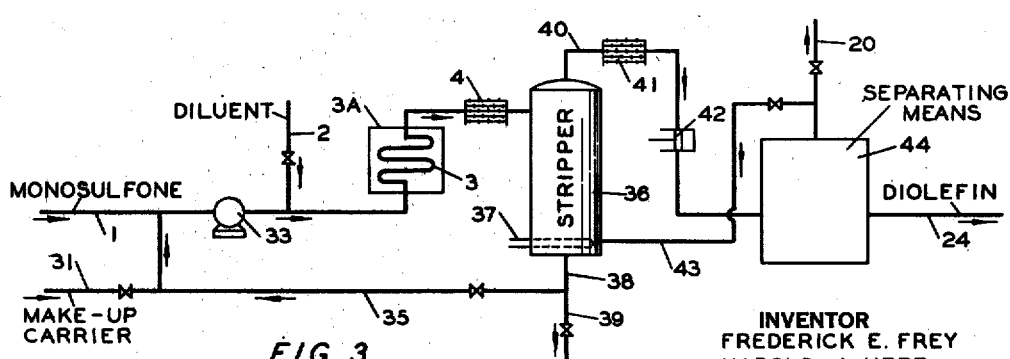

In the accompanying drawing: Figs. 1 to 3 show diagrammatically forms of apparatus which may be used in carrying out the present invention, Fig. 1 showing equipment particularly adapted for carrying out the process wherein the extent of monosulphone decomposition per pass through the decomposition zone is limited, and Figs. 2 and 3 showing equipment for use in carrying out a modified form of the process wherein a carrier is used.

In accordance with the present invention the monosulphone, preferably essentially pure, is decomposed by continuously passing in liquid form through a closed elongated heated zone of restricted cross-section, such as a tube, preferably in the form of a coil, as a tubestill or pipestill heater of the radiant type, in which it is brought to and maintained at a temperature sufficiently elevated and for a period of time sufficiently prolonged to effect decomposition of a substantial proportion of the monosulphone. The decomposition mixture is continuously removed from the exit end of the reaction zone at a rate sufficient to maintain constant pressure in the reaction zone. Preferably the reaction zone is maintained at substantially atmospheric pressure as by allowing free flowing-out of the reaction mixture as formed as it reaches the exit end, so that the only pressure is that due to the resistance to flow in the tube.

We have found that by continuously passing the monosulphone through a reaction tube in the foregoing manner under such conditions that any tarry material formed is carried along with the reaction products and deposited outside the reaction tube that continuous operation is made possible without the inconvenience and expense of frequent stoppage and cleaning of the reaction zone.

We have further found that deposition of tarry and other products may be still more effectively avoided by either or both of two procedures as follows:

(1) By adjusting the contact time and temperature so that the sulphone is not completely decomposed in one passage through the decomposition zone. Apparently the undecomposed monosulphone functions to continuously carry any tarry or other material from the reaction tube to a point outside where it can be conveniently separated.

(2) By providing a carrier which is passed through the decomposition zone with the sulphone. The carrier should be one which is liquid at ordinary or moderately elevated temperatures so that it may be emulsified with the liquid monosulphone. It should be liquid well below the decomposition temperature maintained in the reaction tube and should remain in the liquid form at the temperatures and moderate pressures encountered in the decomposition zone. It should be stable and not decompose at the temperatures encountered. It should be inert with respect to the materials with which it comes into contact. It is preferably substantially immiscible with and a non-solvent for the liquid monosulphone. It should be a solvent for any tarry material or the like undesirable material which might tend to clog the reaction tube. It may be solvent for the diolefin formed but is preferably a non-solvent for sulphur dioxide. A high-boiling mineral oil such as gas oil, mineral seal oil, and the like is preferred. Examples of other suitable carriers are beta, beta-dichlordiethylether, diphenyl, diphenyl oxide, etc. Suitable paraffinic, aromatic, or naphthenic liquids may also be used.

When using either of the foregoing procedures, the tarry and other products of low volatility remain either in solution or suspension in the liquid products leaving the decomposition zone, and may be separated from recycle stock in any convenient manner.

Undesirable polymerization and other reactions which result in the loss of diolefins may be minimized by effecting the decomposition at low pressure, say at not above about two atmospheres and preferably as near atmospheric as possible, or by the presence of an inert diluent such as steam, oxygen-free flue gas, methane, ethane, propane or other hydrocarbons or the like in the reaction zone, or by rapid cooling of the products of decomposition to a point below that at which re-reaction or diolefin polymerization might occur. If desired, a polymerization inhibitor, preferably non-volatile, may also be present, being introduced before the monosulphone has begun to decompose and being separated from the reaction products in any suitable manner and recycled.

Use of an inert gaseous diluent is especially desirable because it serves to dilute the gaseous reaction products, diolefin and sulphur dioxide, as fast as formed and thereby prevent re-reaction.

Where steam is used as the diluent, a convenient mode of operation is to form it in the decomposition zone by introducing liquid water in the infed material. For example instead of liquid anhydrous monosulphone we may introduce an aqueous solution of the monosulphone at room or moderately elevated temperature. Since the reaction temperature is 100° C. or above this water is converted to steam which acts as a diluent for the reaction products.

Where an aqueous monosulphone solution is employed, it should be thoroughly intermixed with the carrier liquid, which is usually water-immiscible, to form an intimate aqueous emulsion for introduction to the decomposition tube.

The monosulphone, with or without a diluent and/or liquid carrier, is introduced to the reaction tube under sufficient pressure to overcome the resistance thereof. The reaction tube is maintained throughout at a substantially constant temperature; say between about 100° C. and about 400° C. and preferably between about 150 C. and about 250° C., in any suitable manner as by liquid or fluid-jacketing, electrical jacketing, or immersion in a suitable heating medium such as a body of liquid or gas at the desired temperature or at the transition temperature, or by use of a suitable heating furnace or zone in which fuel is burned or steam injected.

The time of passage through the reaction tube is preferably such that at least about 30% of the incoming monosulphone is decomposed per pass. Where procedure (1) above is used the upper limit is desirably about 90%. The time of maintenance at the decomposition temperature will vary inversely with the temperature of decomposition. Thus it may vary from about 400 minutes at 100 C. to about a second or less at 250–300° C.

The decomposition products are continuously removed at substantially atmospheric pressure from the reaction zone and treated in any suitable manner to separate undecomposed sulphone and tarry or similar materials from the gaseous decomposition products and gaseous diluent, and, if desired, from the carrier liquid. The monosulphone is preferably purified and recycled. The products are then treated to separately recover the diolefin and the sulphur dioxide. Generally this is effected by extraction of the decomposition mixture, free from monosulphone and tar, with a paraffinic liquid absorbing medium which has a boiling-point sufficiently above that of the diolefin to enable separation therefrom by ordinary fractionation, which is a good solvent for the diolefin, and substantially a nonsolvent for sulphur dioxide. Examples of suitable liquids are high-boiling mineral oil such as paraffin oil, mineral seal oil, gas oil, or the like. This feature of our invention is more fully disclosed in the copending application of one of us, Serial No. 423,535, filed Dec. 18, 1941.

Where a diluent gas is present, it goes along with and dilutes the sulphur dioxide recovered, so that separation of sulphur dioxide by condensation or other suitable means is required before the diluent gas can be recycled. Where the diluent is steam, it may be separated from the reaction mixture by condensation as water which will usually be saturated with sulphur dioxide.

Where the same liquid medium is used as the carrier and as the diolefin extraction medium, such as gas oil, mineral seal oil, etc., separation of the carrier from the reaction mixture before entering the extraction zone is optional. In case separation of carriers is dispensed with, a portion of the stripped, absorption medium may be recycled to act as carrier. Where different liquids are used for the functions of carrier and absorption medium, separation of the carrier before entering the extraction zone is usually essential. In either event, stripping of the decomposition products from the carrier may be practiced and the stripped carrier liquid recycled, thus being kept entirely separate from the diolefin absorption medium. Usually the thus recycled carrier liquid will be in admixture with any undecomposed monosulphone.

In the reaction tube the flow may be either streamline or turbulent, preferably the latter because of more rapid reaction and less side reactions. The adjustment of the necessary factors to give either streamline or turbulent flow is well within the skill of the art. Preferably the reaction tube is free from any restrictions whatever, such as packing, catalyst, baffles, etc.

Referring to Fig. 1, the monosulphone is introduced to the system via pipe 1. If desired, a diluent such as steam, methane, ethane, oxygen-free flue gas, or the like, may be introduced through pipe 2. The sulphone, in liquid form, with or without the diluent gas, passes through the heated reaction zone 3 which takes the form of a tubular coil surrounded by any suitable heating means 3A for maintaining the desired temperature. The temperature maintained in the reaction zone may be in the range of from about 100° to about 400° C., and preferably in the range of from about 150° to about 250° C. The heating time is adjusted so that at least about 30% but not more than about 90% of the sulfone is decomposed in passing through the heating zone 3. The exact value of the heating time varies widely with the temperature maintained in the decomposition zone, varying inversely therewith, and varying to a lesser extent with the particular sulphone being decomposed. Thus piperylene monosulphone decomposes at a somewhat faster rate than the sulphones of butadiene or isoprene at the same temperature. The duration of the heating may range from as long as 400 minutes at 100° C. to a second or less at 250° to 300° C.

From reaction zone 3, the reaction mixture passes to heat exchanger 4 where the temperature of the mixture is so adjusted that the undecomposed sulphone, containing only limited amounts of dissolved sulphur dioxide and diolefin or other volatile hydrocarbons, separates as a liquid phase in separator 5. This sulphone is withdrawn from separator 5 via pipe 8 and passes to the cleaning and purifying zone 12, where it is freed of undesired products such as tarry material, polysulphone or the like in any manner, as for example, by allowing insoluble materials to settle out, or through the use of selective solvents. Dissolved sulphur dioxide and similarly readily volatile material may be removed by distillation if desired. The lines 10 and 11 are indicated for conveying gaseous and solid impurities, respectively, from the unit 12. Polysulphone of either of the aliphatic conjugated diolefin or of cyclopentadiene are quite heat-stable and may be separated out in solid form in unit 12 by suitable precipitation procedure. The pure undecomposed monosulphone is then recycled via line 13 to the stream of fresh monosulphone entering the decomposition tube 3.

If desired, unit 12 may be by-passed partially or entirely by line 9. In some cases the undecomposed monosulphone phase recovered from unit 5 may be so pure that use of unit 12 may be dispensed with entirely.

The uncondensed products from unit 5, comprising mainly diolefin and sulphur dioxide together with diluent gas if used, pass via line 6 to cooler 7 in which they may be rapidly cooled to well below the temperature at which reaction therebetween might occur, and then pass to separator 15 where water containing dissolved sulphur dioxide separates if steam was used as the diluent in the decomposition step. Small amounts of tarry material or polymer (polysulphone or polymerized diolefin) not removed in 5 may also separate in unit 15. The condensate is withdrawn from 15 via line 17.

The uncondensed products from unit 15, which consist essentially of diolefin, sulphur dioxide and diluent if a non-condensible diluent was used in the decomposition step, leave via line 18 and may be separated into the several components in any desired manner as by fractionation, absorption and the like. We have shown an absorption step, employing a mineral oil, as for example gas oil, mineral seal oil, or the like.

The uncondensed products next are compressed by compressor 16 and then pass to absorber 19 into the top of which absorbent oil is introduced via line 26. Heat may be supplied at the bottom of the absorber by means of the reboiler coil 21. The unabsorbed products (sulphur dioxide and diluent gas if used) leave via line 20. The enriched oil, containing dissolved diolefin, passes via line 22 to the top of stripping tower 23. Heat is applied to the bottom of tower 23 by reboiler coil 25. Steam may be introduced through line 29 to aid in the stripping if desired. The diolefin product passes through line 24 and cooler 28 to storage or further purification steps if desired. The stripped oil is withdrawn via line 26 and after cooling in cooler 27 passes to the top of absorber 19. Oil may be withdrawn via line 30 for cleaning if desired.

In Fig. 2, the sulphone enters via line 1. Make-up oil carrier, such as gas oil, enters via line 31 combining with gas oil recycled from the oil absorption step via line 32. The gas oil and sulphone are combined and pass, together with any recycled sulphone from line 13 through pump 33 where the streams are thoroughly mixed. Thorough intermixture at this point is essential in order to insure intimate contact and formation of an emulsion which will last at least until the reaction zone is reached, since the gas oil carrier and the liquid monosulphone are immiscible. Diluent, if desired, enters the line 1 after mixer 33 via line 2. The combined streams then pass through reaction tube 3 where temperature and heating time are regulated to effect partial or complete decomposition of the sulphone per pass through the heating zone 3. The reaction effluent is cooled in exchanger 4, to a point well below the temperature at which re-action would occur, and passes to pump 4A where the pressure is raised to a value suitable for the oil absorption step, as for example to from about 20 to about 100 pounds per square inch gauge. The products then pass to separator 5 where any undecomposed sulphone and insoluble products are separated out. This material may be removed via line 34 or recycled via line 13 with or without partial or complete purification in unit 12 as before. The mixture of gas oil, diolefin and sulphur dioxide passes via line 18 to an oil absorption step as described for Fig. 1. The carrier (gas oil) may be removed before entry into the oil absorption step, stripped of dissolved diolefin, and recycled. Alternatively, where the same oil, for example gas oil, is used as a carrier and as an absorption oil, the excess stripped oil accumulating in the exhaustion or stripping step in the oil absorption end of the process may be recycled to the incoming feed to mixing pump 33 via line 32. If desired, a portion of the gas oil may be removed from the system for cleaning via line 30, as before.

Figure 3 shows a process wherein a carrier, e. g., gas oil, is employed, the carrier oil being kept separate from that used in the product separation step when this is done by means of oil absorption. The sulphone enters the system through pipe 1, make-up gas oil enters through pipe 31, and combines with recycled gas oil and any recycled sulphone flowing through pipe 35. The combined gas oil and sulphone are thoroughly mixed by means of pump 33. Diluent, if desired, is added through pipe 2, and the combined streams pass to the decomposition zone 3, where temperature and heating time are regulated to effect either partial or complete decomposition of the sulphone. The products from the decomposition zone are cooled in the cooler 4 and passed to stripping column 36, where the gas oil is freed of diolefins and sulphur dioxide. Heat is supplied to the bottom of this stripper by means of reboiler coil 37. The stripped gas oil and any undecomposed sulphone pass from the bottom of 36 through pipe 38. Any desired portion may be passed through pipe 39 to purification means not shown in the drawing to be cleaned prior to returning to the process. The remaining product may be recycled directly to the conversion zone 3 by means of line 35. The stripping may be aided in some cases by returning to 36 through pipe 43 some sulphur dioxide or other gaseous product separated at a later stage of the process. The stripped products pass through pipe 40, cooler 41, compressor 42 to separating means 44, where the diolefins are separated from sulphur dioxide and diluent, if this was used. Separating means 44 may be any suitable process, as for example, oil absorption, distillation and the like. Sulphur dioxide, and diluent if used, leave separation zone 44 via line 20 from which any desired portion may be recycled to the column 36 via line 43. The pure diolefin is removed via line 24.

If desired, purification means 12 similar to that shown in line 13 for Figs. 1 and 2 may be interposed in line 35 for purifying recycled gas oil and monosulphone, to separate tarry materials or the like before recycling thereof.

It will be understood that our invention is capable of numerous modifications without departing from the spirit thereof, that the foregoing description is for illustrative purposes only to teach those skilled in the art how to practice our invention, and that our invention is to be limited only by the language of the appended claims.

As used herein, the term "of restricted cross section" means of limited cross-section, that is of cross-sectional area such that flow is confined to substantially one general direction from one end thereof to the other. Generally the tube used will have an internal diameter not exceeding about 4 inches and not smaller than about one-sixteenth of an inch. Usually tubes of a size such as is commonly used for hydrocarbon cracking operations will be employed.

We claim:

1. The process of decomposing monosulphone of aliphatic conjugated diolefin which comprises continuously feeding said monosulphone into the inlet end of a closed elongated zone of restricted cross section such that flow is confined to one general direction from the inlet to the outlet end thereof, continuously passing said monosulphone through said zone from the inlet to the outlet end thereof while subjecting it to a temperature sufficiently elevated and to other conditions such as to effect incomplete decomposition of said monosulphone to the diolefin and sulphur dioxide, and continuously removing the decomposition mixture from the outlet end of said zone.

2. The process of decomposing monosulphone of aliphatic conjugated diolefin which comprises continuously feeding a mixture of said monosulphone and an inert stable liquid carrier which remains liquid and undecomposed during the decomposition into the inlet end of a closed elongated zone of restricted cross section such that flow is confined to one general direction from the inlet to the outlet end thereof, continuously passing said mixture through said zone from the inlet to the outlet end thereof while subjecting it to a temperature sufficiently elevated and to other conditions such as to effect decomposition of said monosulphone to the diolefin and sulphur dioxide, and continuously removing the decomposition mixture from the outlet end of said zone.

3. The process of decomposing monosulphone of aliphatic conjugated diolefin which comprises feeding a mixture of said monosulphone and gas oil as a carrier into the inlet end of a closed elongated zone of restricted cross section such that flow is confined to one general direction from the inlet to the outlet end thereof, continuously passing said mixture through said zone from the inlet to the outlet end thereof while subjecting it to a temperature sufficiently elevated and to other conditions such as to effect decomposition of said monosulphone to the diolefin and sulphur dioxide, and continuously removing the decomposition mixture from the outlet end of said zone.

4. The process of decomposing monosulphone of aliphatic conjugated diolefin which comprises continuously feeding an emulsion of the liquid monosulphone and an immiscible, inert, stable carrier which remains liquid and undecomposed during the decomposition into the inlet end of a closed elongated zone of restricted cross section such that flow is confined to one general direction from the inlet to the outlet end thereof, continuously passing said emulsion through said zone from the inlet to the outlet end thereof while subjecting it to a temperature sufficiently elevated and to other conditions such as to effect decomposition of said monosulphone to the diolefin and sulphur dioxide, and continuously removing the decomposition mixture from the outlet end of said zone.

5. The process of decomposing monosulphone of aliphatic conjugated diolefin which comprises continuously feeding an emulsion of an aqueous solution of said monosulphone and a water-immiscible, inert, stable liquid carrier which remains liquid and undecomposed during the decomposition into the inlet end of a closed elongated zone of restricted cross section such that flow is confined to one general direction from the inlet to the outlet end thereof, continuously passing said emulsion through said zone from the inlet to the outlet end thereof while subjecting it to a temperature sufficiently elevated and to other conditions such as to effect decomposition of said monosulphone to the diolefin and sulphur dioxide, and continuously removing the decomposed mixture to the outlet end of said zone.

6. The process of decomposing monosulphone of aliphatic conjugated diolefin which comprises continuously feeding a mixture of said monosulphone and a liquid carrier which remains liquid and undecomposed during the decomposition into the inlet end of a closed elongated zone of restricted cross section such that flow is confined to one general direction from the inlet to the outlet end thereof, continuously passing said mixture through said zone from the inlet to the outlet end thereof while subjecting it to a temperature sufficiently elevated and to other conditions such as to effect decomposition of said monosulphone to the diolefin and sulphur dioxide, and continuously removing the decomposition mixture from the outlet end of said zone.

7. The process of claim 6 wherein said temperature is from 100° C. to 400° C.

8. The process of claim 6 wherein said temperature is from 150° C. to 250° C.

9. The continuous process of effecting thermal decomposition of aliphatic conjugated diolefin monosulphones to effect recovery of the diolefin combined therein and preventing deposition of tarry and like insoluble materials in the decomposition zone which comprises continuously passing a mixture of said monosulphone in liquid form and a liquid carrier which remains liquid and undecomposed during the decomposition through a closed elongated heated zone of restricted cross-section, and free from internal restrictions, bringing said monosulphone as it flows through said zone up to and maintaining it at a temperature between about 150° C. and about 250° C. for a sufficient period of time to effect at least about 30% decomposition of the incoming monosulphone in a single pass through the zone, continuously supplying said liquid monosulphone to the entrance end of said zone under pressure only sufficient to force the reaction stream through said zone, continuously maintaining the material at exit end of said zone at substantially atmospheric pressure, continuously removing the decomposition mixture from the exit end of said zone at a rate sufficient to maintain substantially constant pressure in said zone, whereby any tarry and like material formed in said zone is continuously carried along with the reaction stream to a point outside said zone so that continuous operation is possible.

10. The process of claim 9 including the further step of adjusting reaction time and temperature in such manner that the monosulphone is not more than about 90% decomposed in a single pass whereby the undecomposed monosulphone continuously carries tarry and like material from the reaction tube to a point outside said zone.

11. The process of claim 9, said carrier being liquid at temperatures well below the reaction temperatures and remaining liquid at the reaction temperatures, said carrier being stable and inert, being substantially a non-solvent for the monosulphone, a solvent for tarry and like material, a solvent for the diolefin formed and substantially a non-solvent for sulphur dioxide, whereby said carrier continuously carries tarry and like material from said zone to a point outside said zone.

12. The process of claim 9 wherein said carrier is gas oil.

FREDERICK E. FREY.
HAROLD J. HEPP.